US009866751B2

(12) United States Patent
Nakajima

(10) Patent No.: US 9,866,751 B2
(45) Date of Patent: Jan. 9, 2018

(54) IMAGE RECORDING APPARATUS AND IMAGING APPARATUS

(71) Applicant: CANON KABUSHIKI KAISHA, Tokyo (JP)

(72) Inventor: Hirofumi Nakajima, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 484 days.

(21) Appl. No.: 14/477,640

(22) Filed: Sep. 4, 2014

(65) Prior Publication Data

US 2015/0070463 A1   Mar. 12, 2015

(30) Foreign Application Priority Data

Sep. 6, 2013   (JP) .................................. 2013-184694

(51) Int. Cl.
*H04N 5/235* (2006.01)
*H04N 5/232* (2006.01)
*H04N 5/262* (2006.01)

(52) U.S. Cl.
CPC ....... *H04N 5/23238* (2013.01); *H04N 5/2628* (2013.01)

(58) Field of Classification Search
CPC .................... H04N 5/23238; H04N 5/2628
See application file for complete search history.

(56) References Cited

U.S. PATENT DOCUMENTS

| 4,496,956 | A | * | 1/1985 | Mitsuka | .................. | G01D 9/42 |
| | | | | | | 347/232 |
| 5,216,523 | A | * | 6/1993 | Kawanowa | ........ | G06K 7/10881 |
| | | | | | | 358/471 |
| 5,948,038 | A | * | 9/1999 | Daly | .................... | G08G 1/0175 |
| | | | | | | 340/933 |
| 6,072,545 | A | * | 6/2000 | Gribschaw | ............... | H04N 5/74 |
| | | | | | | 348/37 |
| 6,642,960 | B1 | * | 11/2003 | Kohashi | ................. | H04N 5/367 |
| | | | | | | 348/246 |
| 7,145,597 | B1 | * | 12/2006 | Kinjo | ................. | H04N 1/00132 |
| | | | | | | 348/222.1 |
| 7,385,624 | B2 | * | 6/2008 | Takehara | ............... | H04N 5/232 |
| | | | | | | 348/155 |

(Continued)

FOREIGN PATENT DOCUMENTS

JP   2001109881 A   4/2001
JP   2005196423 A   7/2005
(Continued)

*Primary Examiner* — Sath V Perungavoor
*Assistant Examiner* — Philip Dang
(74) *Attorney, Agent, or Firm* — Canon U.S.A., Inc. IP Division

(57) ABSTRACT

There are provided an image recording apparatus and an imaging apparatus. In the image recording apparatus and the imaging apparatus, a control unit identifies whether an input image input by an image input unit is an omnidirectional image or an ordinary image. An image editing unit, based on an omnidirectional image, converts the omnidirectional image into a panoramic image by developing the omnidirectional image in a circumferential direction. Then, the image editing unit records the converted panoramic image on a recording medium. As for an ordinary image, the image editing unit records the input image input by the image input unit on the recording medium.

17 Claims, 7 Drawing Sheets

(56) References Cited

U.S. PATENT DOCUMENTS

| | | | | |
|---|---|---|---|---|
| 7,483,590 | B2* | 1/2009 | Nielsen | G06T 3/0062 345/419 |
| 8,218,943 | B2* | 7/2012 | Iwane | G06F 17/30817 348/218.1 |
| 8,319,618 | B2* | 11/2012 | Gomi | B60R 1/00 340/435 |
| 8,425,318 | B2* | 4/2013 | Canterbury | G07F 17/3211 345/4 |
| 8,736,703 | B2* | 5/2014 | Iwamoto | H04N 1/32128 348/222.1 |
| 8,810,643 | B2* | 8/2014 | Shigeeda | H04N 5/232 348/81 |
| 8,823,854 | B2* | 9/2014 | Yoshida | H04N 5/23293 348/208.1 |
| 2004/0247173 | A1* | 12/2004 | Nielsen | G06T 3/0062 382/154 |
| 2005/0099500 | A1* | 5/2005 | Fujita | H04N 5/23206 348/207.99 |
| 2007/0159527 | A1* | 7/2007 | Kim | G06T 3/4038 348/97 |
| 2009/0046990 | A1* | 2/2009 | Takemura | B60R 1/00 386/222 |
| 2010/0214412 | A1* | 8/2010 | Ehlgen | G06K 9/00791 348/148 |
| 2011/0234761 | A1* | 9/2011 | Yumiba | B60R 1/00 348/46 |
| 2011/0267532 | A1* | 11/2011 | Sakurai | H04N 5/23212 348/345 |
| 2012/0045149 | A1* | 2/2012 | Arai | H04N 7/183 382/296 |
| 2012/0050280 | A1* | 3/2012 | Kim | H04N 13/0438 345/419 |
| 2012/0146929 | A1* | 6/2012 | Oyama | G06F 3/0416 345/173 |
| 2012/0162357 | A1* | 6/2012 | Okegawa | G06T 3/0025 348/36 |
| 2012/0162393 | A1* | 6/2012 | Okegawa | H04N 5/23209 348/50 |
| 2013/0002712 | A1* | 1/2013 | Fujii | G08B 13/19602 345/620 |
| 2013/0057542 | A1* | 3/2013 | Takenaka | G06T 3/0031 345/419 |
| 2013/0058579 | A1* | 3/2013 | Kawanishi | G06K 9/00228 382/195 |
| 2013/0204085 | A1* | 8/2013 | Alexander | A61B 1/05 600/109 |

FOREIGN PATENT DOCUMENTS

| | | |
|---|---|---|
| JP | 2005-303340 A | 10/2005 |
| JP | 2010104013 A | 5/2010 |
| JP | 2011139376 A | 7/2011 |
| JP | 2012134833 A | 7/2012 |

* cited by examiner

IMAGE RECORDING APPARATUS AND IMAGING APPARATUS

BACKGROUND OF THE INVENTION

Field of the Invention

The present invention relates to an image recording apparatus and an imaging apparatus. More particularly, the present invention relates to an image recording apparatus and an imaging apparatus that record surrounding images such as omnidirectional images.

Description of the Related Art

An omnidirectional image is an image that is captured as one continuous image over a range of 360 degrees orthogonal to a front direction, and is captured, for example, by a dedicated omnidirectional camera or by an ordinary camera with an omnidirectional imaging unit attached thereto. For example, an image that covers an entire range of 360 degrees on a horizontal plane within its view angle can be obtained. An omnidirectional imaging unit is, for example, an adaptor attachable to and detachable from a front surface of an imaging lens of an ordinary camera, and has a structure that includes a circular conical mirror surface that is protruded toward the imaging lens. The circular conical mirror shape deflects the optical axis of the imaging lens into a lateral direction.

An omnidirectional image captured by using such an omnidirectional imaging unit generally has a donut shape whose central and peripheral portions have different scales as illustrated in FIG. 7A. This image is very hard for a user to visually recognize. Therefore, usually, this captured image is digitally processed by a personal computer or the like so as to be developed into a panoramic image covering an entire circumference as shown FIG. 7B. Hereinafter, such a process of converting an omnidirectional image into a panoramic image will be termed panoramic development. Japanese Patent Application Laid-Open No. 2005-303340 describes that an omnidirectional image is converted into images of an ordinary view angle by a non-linear resolution conversion process.

Furthermore, a picture covering an entire 360-degree area can also be captured by one shot through the use of a super-wide-angle lens such as a fish-eye lens. In this case, the captured image has a circular shape whose central portion corresponds to a front area.

SUMMARY OF THE INVENTION

According to an aspect of the present invention, an image recording apparatus includes an identification unit configured to identify whether an input image is a surrounding image, a development unit configured to generate a developed image obtained by developing the surrounding image in a circumferential direction, and a control unit configured to record the input image on a recording medium that is attachable to and detachable from the image recording apparatus, wherein when the input image is identified as being the surrounding image, the control unit performs control so that the developed image is generated by the development unit, and is recorded on the recording medium, and when the input image is identified as not being the surrounding image, the control unit performs control so that the input image is recorded on the recording medium without generating the developed image by the development unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

Figure 1:
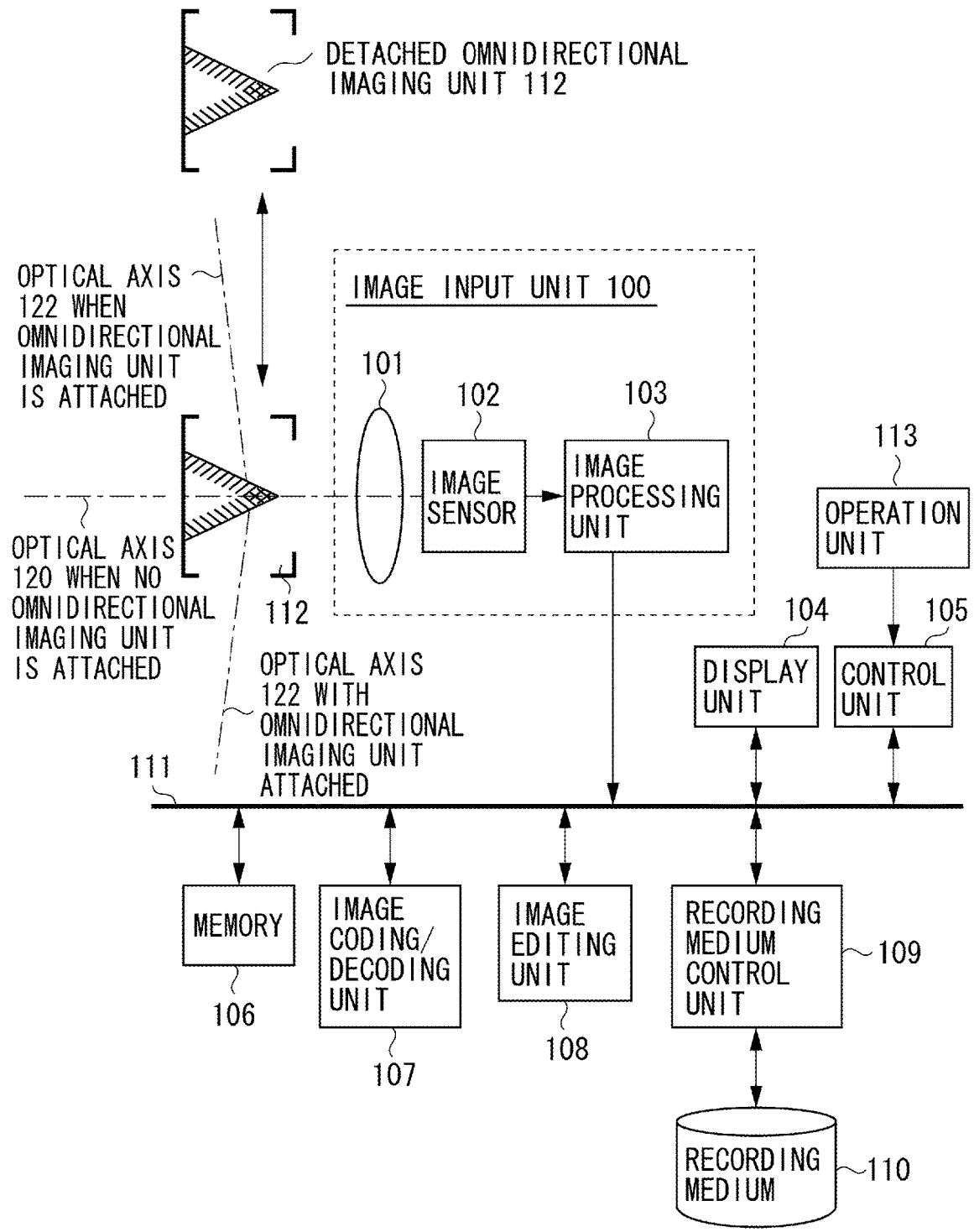
FIG. 1 is a block diagram illustrating a general construction according to an exemplary embodiment of the present invention.

FIG. 1 is a block diagram illustrating a general construction of an example imaging apparatus in which an image recording apparatus according to an exemplary embodiment of the present invention is incorporated.

An image input unit 100 includes an imaging lens 101, an image sensor 102, and an image processing unit 103. The imaging lens 101 allows the focal length and the aperture to be changed. The image sensor 102 is a device that converts an optical image obtained through the imaging lens 101 into electrical signals, and is made up of, for example, a charge coupled device (CCD) image sensor or a complementary metal-oxide semiconductor (CMOS) image sensor.

The image processing unit 103 performs various processes on an output image signal of the image sensor 102 according to an imaging mode, for example, a predetermined image processing such as white balancing, γ-correction, etc., and writes the obtained image data into a memory 106. A user is allowed to specify the imaging mode via an operation unit 113.

The display unit 104 functions as a view finder at the time of capturing an image. In a reproduction mode, the display unit 104 is capable of displaying an index image that shows thumbnail images of recorded images in a list view, and also displaying a reproduced image of each recorded image. In a case where the operation unit 113 has a touch panel, the touch panel is disposed on a display screen of the display unit 104. Therefore, by various touch operations, the user can give instructions to the control unit 105.

The control unit 105 controls the entire imaging apparatus according to inputs from the operation unit 113 and the state of operation. The control unit 105, based on a program read from a program memory (not illustrated), performs computing processes and the controlling of various functional blocks so that recording operations described below are carried out. Furthermore, the control unit 105 has a function of determining whether input image data written in the memory 106 by the image processing unit 103 is ordinary image data or omnidirectional image data, which is described in detail below.

The memory 106 is used as a buffer memory for input image data and compressed image data, or as a work memory for the control unit 105.

An image coding/decoding unit 107 codes still image data based on a Joint-Photographic-Experts-Group (JPEG) format to generate JPEG data, and decodes JPEG data to obtain decompressed image data. At the time of recording, the image coding/decoding unit 107 codes input image data written in the memory 106 into JPEG data using a compression parameter specified by the control unit 105, and writes the data back into the memory 106 in a DCF format. At the time of reproduction, the image coding/decoding unit 107 decodes JPEG data from the memory 106 to reproduce image data, and writes the reproduced image data back into the memory 106.

An image editing unit 108 performs a panoramic development in which omnidirectional image data is converted into panoramic image data. That is, the image editing unit 108 develops omnidirectional image data (FIG. 7A) from the memory 106 into horizontally elongated rectangular panoramic image data (FIG. 7B), and writes the panoramic image data back into the memory 106. The image editing unit 108 is also equipped with a function of performing a size reduction process and a trimming process on the input image data from the memory 106 and therefore generating thumbnail images for use in a list view image display (index image display). The image editing unit 108 writes the created thumbnail image data into the memory 106.

A recording medium control unit 109 controls the reading of data from and the writing of data into the recording medium 110 and thereby manages the file system. More specifically, the recording medium control unit 109 records data in the DCF format from the memory 106 onto a recording medium 110, and reads DCF-format data recorded on the recording medium 110 and writes the read DCF-format data into the memory 106.

The recording medium 110 is a recording medium, such as a memory card, that is attachable to and detachably from the image recording apparatus.

A data bus 111 is used for access from the control unit 105 to the various functional blocks and for data transfer between the functional blocks via the memory 106, etc.

Figure 7A:
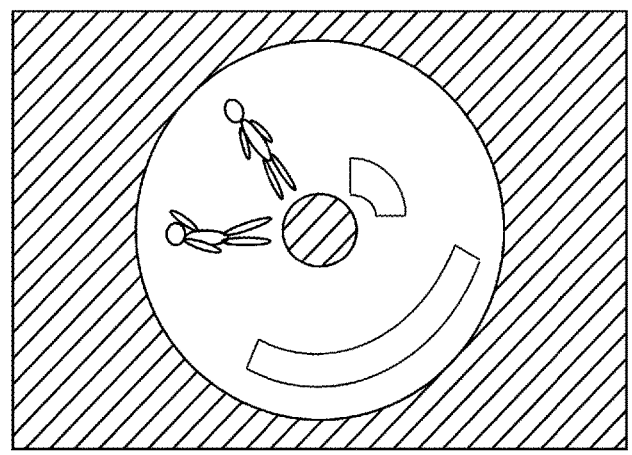
FIGS. 7A, 7B and 7C illustrate examples of an omnidirectional image, a developed image, and a list view display, respectively.

An omnidirectional imaging unit 112 is attachable to and detachable from a front surface of the imaging lens 101. When the omnidirectional imaging unit 112 is attached to the imaging lens 101, the image input unit 100 outputs image data about a donut-shaped omnidirectional image obtained by simultaneously imaging a 360° area, as illustrated in FIG. 7A. On the other hand, when the omnidirectional imaging unit 112 is not attached to the imaging lens 101, the image input unit 100 outputs image data about a rectangular image of a predetermined aspect ratio obtained by capturing an image of a subject in front of the imaging lens 101.

The operation unit 113 serves as a user interface to the imaging apparatus illustrated in FIG. 1, and is made up of various operation switches, operation buttons, etc., and outputs results of operation to the control unit 105.

The omnidirectional imaging unit 112 is attachable to and detachable from the front surface of the imaging lens 101. The omnidirectional imaging unit 112 is an optical adaptor in which a circular conical reflection mirror of the optical adaptor that is protruded toward the imaging lens 101 is disposed on a center optical axis 120 of the imaging lens 101. When the omnidirectional imaging unit 112 is not attached to the imaging lens 101, the center optical axis 120 of the imaging lens 101 serves as an imaging optical axis and the image sensor 102 captures an image of subjects present in front of the imaging lens 101. On the other hand, when the omnidirectional imaging unit 112 is attached to the imaging lens 101, the circular conical mirror of the omnidirectional imaging unit 112 deflects the imaging optical axis into lateral directions (deflected imaging optical axes 122). At this time, the image sensor 102 can take a 360° area around the optical axis 120 as an imaging field, and therefore captures an image of subjects in the 360° area.

Figure 2:
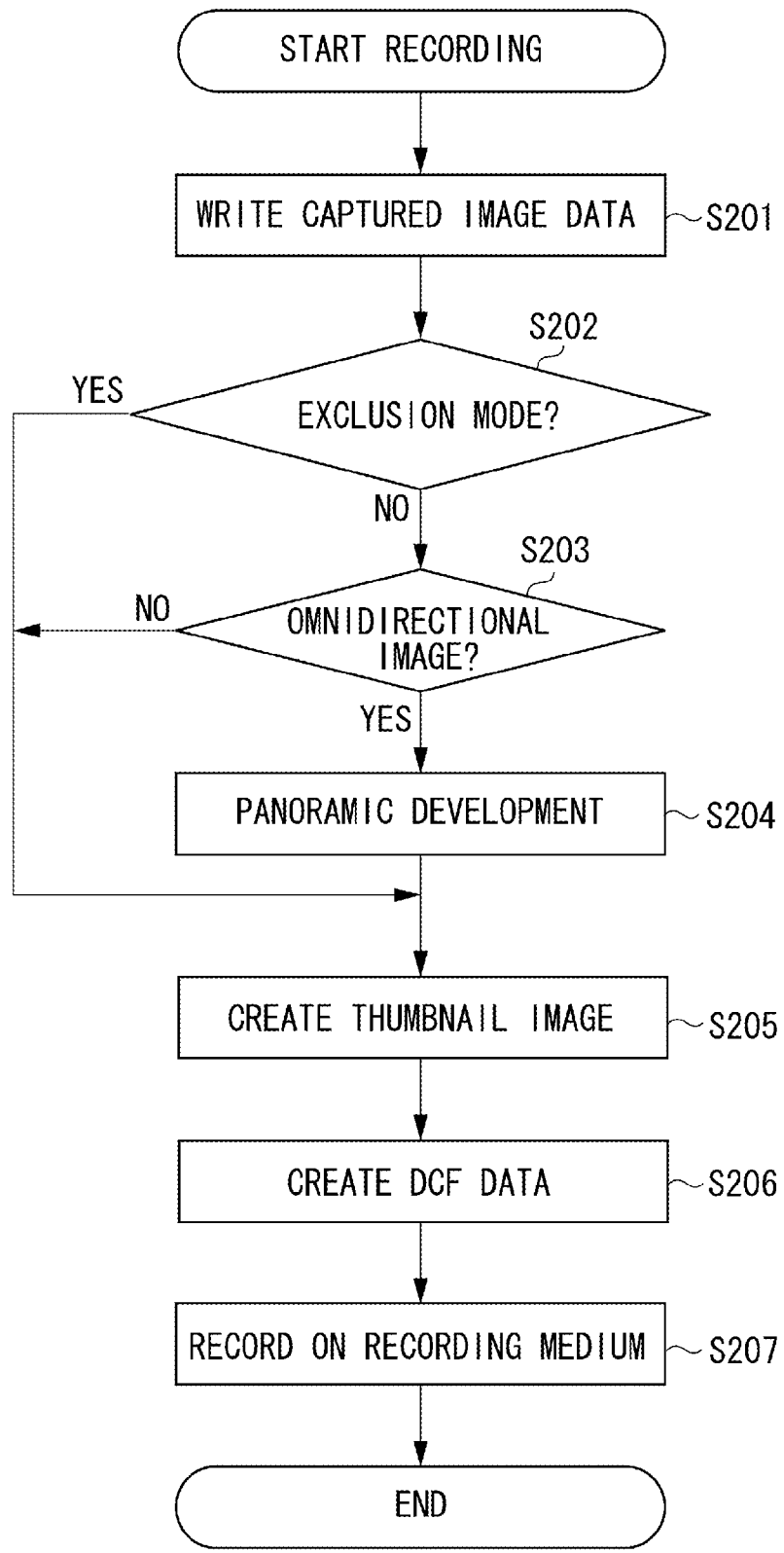
FIG. 2 is an operation flowchart according to the exemplary embodiment.

With reference to FIG. 2, recording operations according to the present exemplary embodiment will be described. When a user inputs a recording instruction to the control unit 105 via the operation unit 113, a flow illustrated in FIG. 2 starts.

In step S201, the image sensor 102 converts an optical image having passed through the imaging lens 101 into an electric signal. Then, the image processing unit 103 performs image processing, such as white balancing and γ-correction, on the image signal from the image sensor 102, and writes the obtained captured image data into the memory 106 as input image data.

In step S202, the control unit 105 determines whether an imaging mode of excluding the determination as to whether the captured image is an omnidirectional image or an ordinary image has been set. Such an imaging mode is, for example, a nightscape imaging mode or a firework imaging mode. Hereinafter, the imaging mode of excluding the determination as to whether the captured image is an omnidirectional image or an ordinary image will be referred to as exclusion mode. When the exclusion mode has been set (YES in step S202), the processing proceeds to step S205. When the exclusion mode has not been set (NO in step S202), the processing proceeds to step S203.

In step S203, the control unit 105 reads the input image data written in the memory 106, and determines whether the image data is of an omnidirectional image or of an ordinary image. Since the omnidirectional image is a donut-shaped image as illustrated in FIG. 7A, the control unit 105 can identify the omnidirectional image based on whether a specific portion of a periphery (and the center) of the image is a black image. If it is determined that the image is an omnidirectional image (YES in step S203), the processing proceeds to step S204. If it is determined that the image is an ordinary image (NO in step S203), the processing proceeds to step S205.

Figure 4:
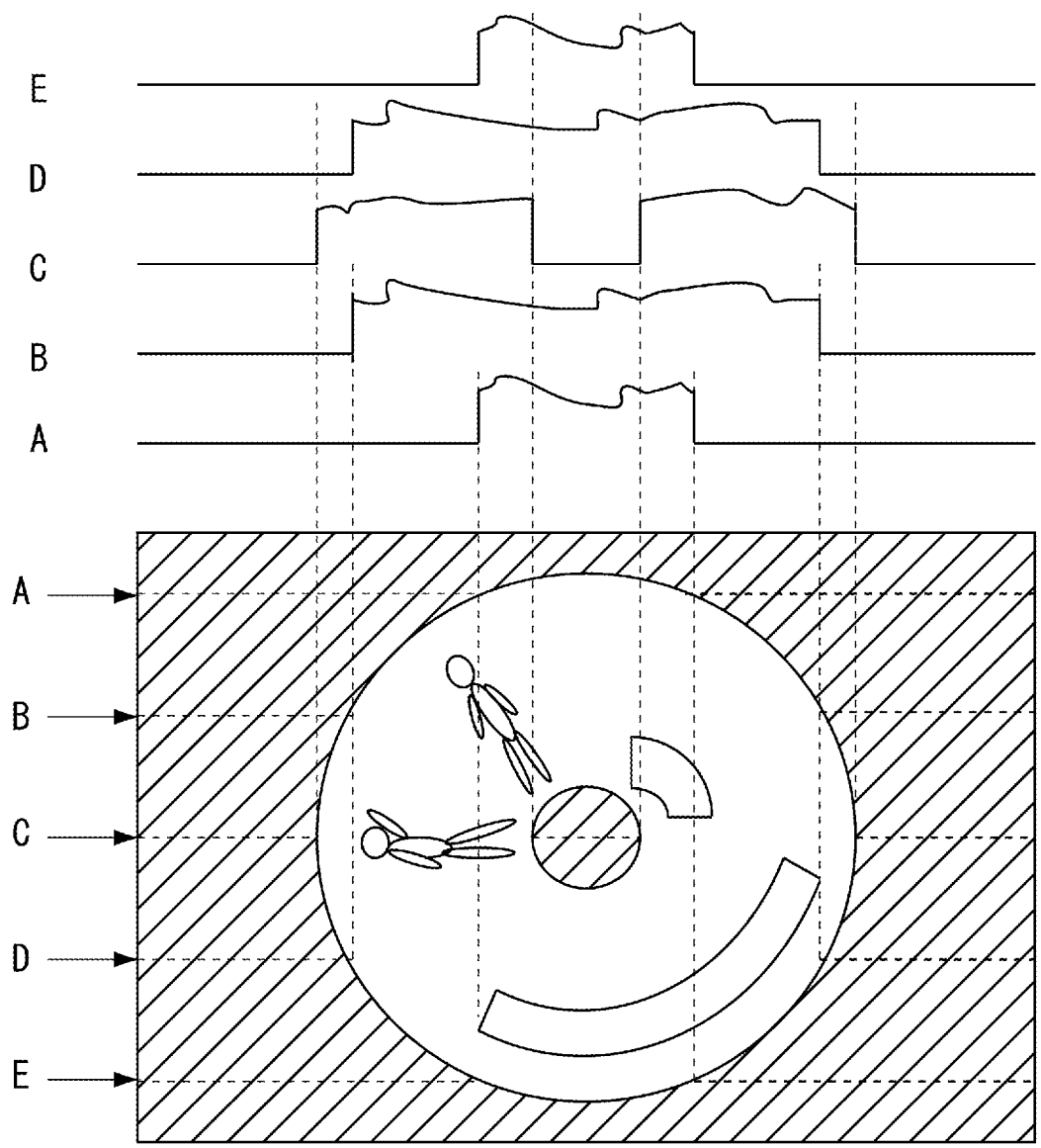
FIG. 4 is an illustrative diagram illustrating an omnidirectional image identification method.

With reference to FIG. 4, the method for identifying a donut-shaped omnidirectional image will be described. In an example illustrated in FIG. 4, the control unit 105 detects luminance distributions along five horizontal lines A, B, C, D and E in a captured image.

The line C is a center line of the image, and the lines B and D and the lines A and E are apart upwardly and downwardly, respectively, from the center line C by the same distances.

Since the omnidirectional image is a donut-shaped image, two ends of the image on all the lines A, B, C, D and E are black images, i.e., images whose luminance is zero, and the other portions of the omnidirectional image have luminances that are distributed according to the content of the image.

Since the line C is located on the center of the image, a range along the line that corresponds to a central portion of the image is a black image.

The black distributions at the two ends are the shortest along the center line C. The black distributions at the two ends become progressively longer from the center of the image toward ends of the image with respect to vertical directions.

In the example illustrated in FIG. 4, a black distribution in the central portion of the image appears only along the line C among the five lines. The lengths of the black distributions at the two ends of the image have a relation of (A≈E)>(B≈D)>C. In this expression, A, B, C, D and E represent the numbers of pixels of black images whose luminance values are in the vicinity of zero. If these conditions are satisfied, the control unit 105 determines that the input image is an omnidirectional image. Obviously, when a fish-eye lens is used, a black image on a central portion of the line C does not meet the conditions for determining that the input image is an omnidirectional image.

Figure 7B:
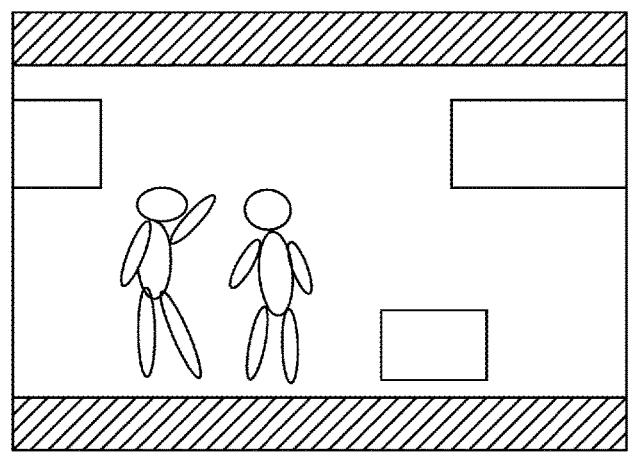

Referring back to FIG. 2, in step S204, the image editing unit 108 converts the omnidirectional image (for example, the donut-shaped image illustrated in FIG. 7A) written in the memory 106 into a developed image obtained by developing the omnidirectional image in a circumferential direction thereof (for example, a horizontally elongated rectangular panoramic image illustrated in FIG. 7B). The image editing unit 108 writes image data of the developed image into the memory 106. In the present exemplary embodiment, it is assumed that the center of the image to be panoramically developed is at a predetermined position.

In step S205, the image editing unit 108 reads image data (input image data in a case of an ordinary image, and developed image data in a case of an omnidirectional image) from the memory 106, and performs the size reducing and trimming processes on the image data to generate thumbnail image data. The image editing unit 108 functions as a thumbnail generation unit. The generated thumbnail image data is used for index display. The image editing unit 108 writes the generated thumbnail image data into the memory 106. A thumbnail image may be an image obtained by reducing the size of the entire view angle image or may also be an image obtained by reducing the size of an image cut out from a portion of the entire view angle image. In the present exemplary embodiment, each thumbnail image has a size whose horizontal number of pixels is 160 and whose vertical number of pixels is 120.

Figure 3:
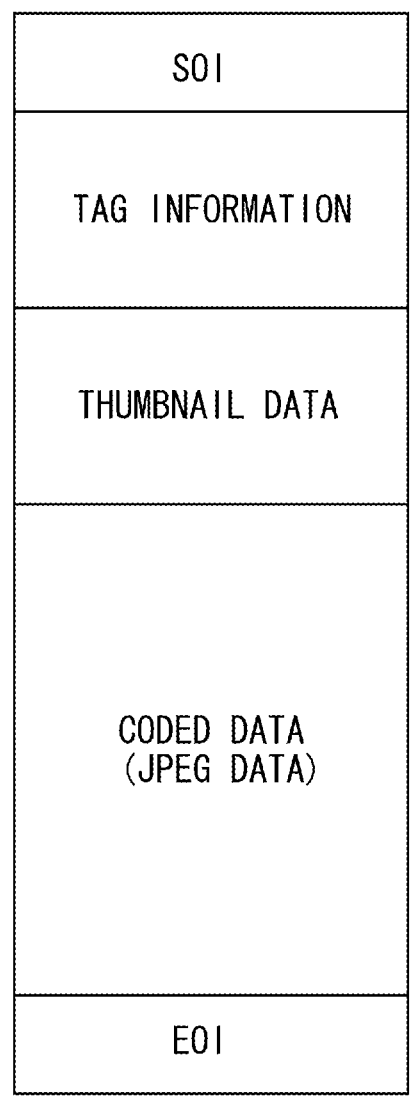
FIG. 3 illustrates an example of a data structure of Design-Rule-for-Camera-File-System (DCF) data.

In step S206, the image coding/decoding unit 107 reads the input image data and the thumbnail image data generated in step S205 from the memory 106, and codes the read image data to generate coded data. The image coding/decoding unit 107 generates pieces of information that are necessary for the DCF format, that is, start of image (SOI), end of image (EOI) and tag (TAG), and writes the necessary pieces of information together with the coded data back into the memory 106 in the DCF format. The TAG information includes the maker's name, the model's name, the date and time of creation, etc., and further includes information that indicates whether the image is an omnidirectional image or an ordinary image. The SOI information and the EOI information are a predetermined start marker and a predetermined end marker, respectively. An example of the DCF structure is illustrated in FIG. 3.

In step S207, the recording medium control unit 109 reads data in DCF format from the memory 106, and records the data on the recording medium 110. This completes the flow illustrated in FIG. 2.

Although in step S203, the control unit 105 evaluates whether the input image is an omnidirectional image based on the distributions of black portions on the cutting lines, it is also possible for the user to visually check the image and specify whether the input image is an omnidirectional image by using the operation unit 113. Furthermore, whether the input image is an omnidirectional image may be determined based on whether the image is circular in shape or whether the image has in its central region a black circular shape, or on the basis of the image itself, etc.

Input images are recorded in the above-described manner. As a result, when a captured image is an omnidirectional image, a developed image of the omnidirectional image is recorded on the recording medium. Therefore, when reproduced, the omnidirectional image can be reproduced as an image that is as easy to see as ordinary images.

Figure 7C:
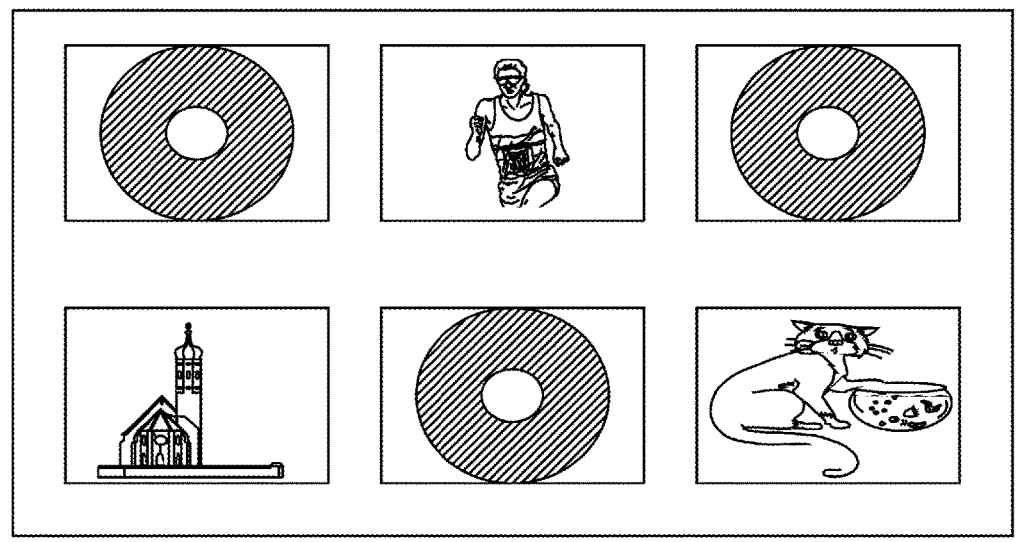

The image recording apparatus is equipped with a function of displaying thumbnail images in a list view, that is, a generally termed index display. In a case of a camera that can use an attachable and detachable omnidirectional imaging unit, its recorded images include a mixture of omnidirectional images (FIG. 7A) obtained by using the omnidirectional imaging unit and ordinary images obtained without using the omnidirectional imaging unit. If in such a situation of mixed image types, the index display in which thumbnail images are displayed in a list view is selected, a an image illustrated in FIG. 7C is displayed on the display screen of the display unit 104. In this case, the omnidirectional images are displayed as donut-shaped thumbnail images, and therefore it is difficult to visually check the contents of the images.

However, according to the present exemplary embodiment, in the case of an omnidirectional image, a thumbnail image generated from a developed image of the omnidirectional image is recorded, so that even omnidirectional images can be displayed as easy-to-see thumbnail images.

Figure 5:
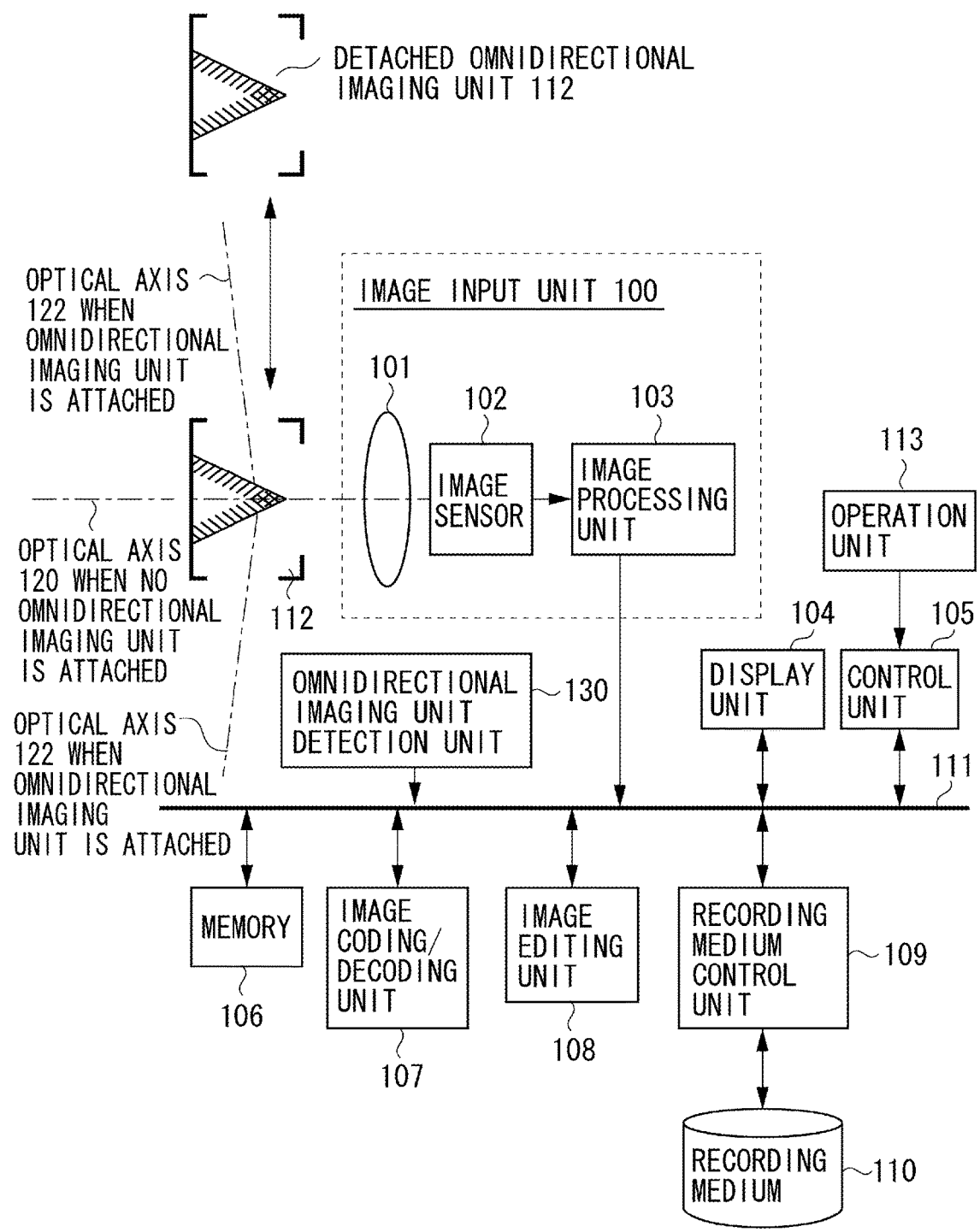
FIG. 5 is a block diagram illustrating a general construction of a modification that has an omnidirectional imaging unit detection unit.

In the flow illustrated in FIG. 2, whether the input image is an omnidirectional image is determined through image processing. However, according to a second exemplary embodiment, as illustrated in FIG. 5, an omnidirectional imaging unit detection unit 130 that detects attachment of the omnidirectional imaging unit 112 to the imaging lens 101 may be provided, and an omnidirectional image may be identified according to detection results provided by the omnidirectional imaging unit detection unit 130.

The omnidirectional imaging unit detection unit 130 includes a mechanical switch that is turned off when the omnidirectional imaging unit 112 is not attached, and is turned on when the omnidirectional imaging unit 112 is attached. The control unit 105, based on the detection output of the omnidirectional imaging unit detection unit 130, determines whether a captured image is an omnidirectional image, and acts as in the first exemplary embodiment, according to a result of the discernment.

Figure 6:
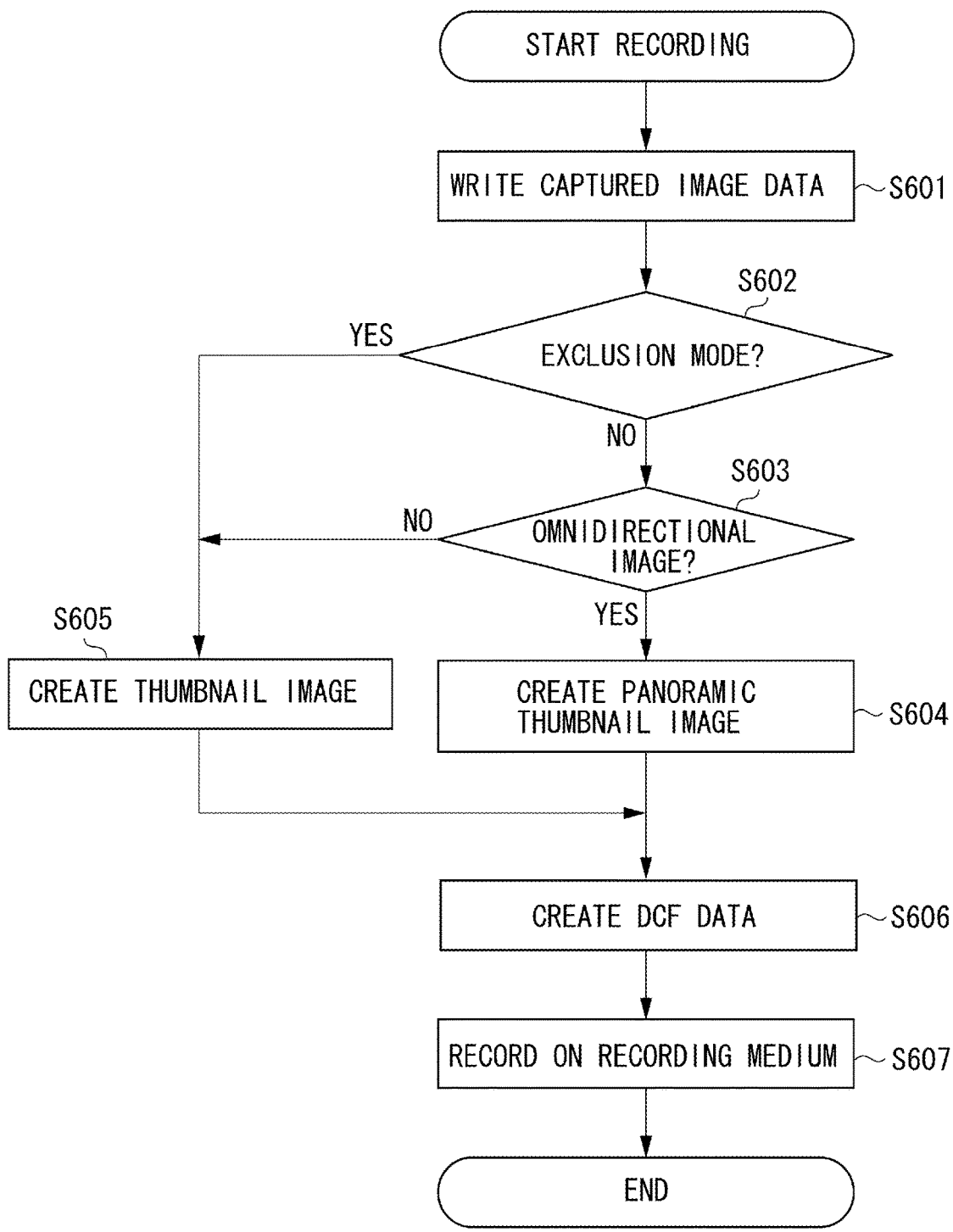
FIG. 6 is another operation flowchart according to the exemplary embodiment illustrated in FIG. 1.

In the flow illustrated in FIG. 2, an omnidirectional image is subjected to the development process to generate a panoramic image, followed by the reduction in size to generate a thumbnail image. However, the size reduction may be performed first and then the development process may be performed to generate a thumbnail image in a panoramic image format. FIG. 6 illustrates a flowchart of such modified operations.

When a user inputs a recording instruction to the control unit 105 via the operation unit 113, the flow illustrated in FIG. 6 starts.

In step S601, the image sensor 102 converts an optical image having passed through the imaging lens 101 into an electric signal. Then, the image processing unit 103 performs image processing, such as white balancing and γ-correction, on the image signal from the image sensor 102, and writes the obtained captured image data into the memory 106 as input image data.

In step S602, the control unit 105 determines, as in step S202, whether the imaging mode of excluding the determination as to whether the captured image is an omnidirectional image or an ordinary image has been set. When the exclusion mode has been set (YES in step S602), the processing proceeds to step S605. When the exclusion mode has not been set (NO in step S602), the processing proceeds to step S603.

In step S603, the control unit 105, as in step S203, reads the input image data written in the memory 106, and determines whether the image data is of an omnidirectional image or of an ordinary image. If it is determined that the image is an omnidirectional image (YES in step S603), the processing proceeds to step S604. If it is determined that the image is an ordinary image (NO in step S603), the processing proceeds to step S605.

In step S604, the image editing unit 108 reduces the size of the omnidirectional image written in the memory 106 (for example, a donut-shaped image illustrated in FIG. 7A), to generate a thumbnail image needed for index display. This thumbnail image may be either an image obtained by reducing the size of the entire view angle image or an image obtained by reducing the size of an image cut out from a portion of the entire view angle image. Next, the image editing unit 108 develops the generated thumbnail image in a circumferential direction to convert it into a thumbnail image in the panoramic image format. The image editing unit 108 writes the thumbnail image data in the panoramic image format into the memory 106. In the present exemplary embodiment, it is assumed that the center of the image to be panoramically developed is at a predetermined position. Furthermore, each thumbnail image has a size whose horizontal number of pixels is 160 and whose vertical number of pixels is 120.

In step S605, the image editing unit 108 reads the input image data of the ordinary image from the memory 106, and performs the size reducing and trimming processes on the image data to generate thumbnail image data. The generated thumbnail image data is used for index display. The image editing unit 108 writes the generated thumbnail image data into the memory 106. This thumbnail image may be an image obtained by reducing the size of the entire view angle image or may also be an image obtained by reducing the size of an image cut out from a portion of the entire view angle image. In the present exemplary embodiment, each thumbnail image has a size whose horizontal number of pixels is 160 and whose vertical number of pixels is 120.

The operations in step S606 and the subsequent steps are similar to those in step S206 and the subsequent steps in FIG. 2, and therefore description thereof is omitted.

In the flow illustrated in FIG. 6, the process of generating a developed image from an omnidirectional image can be carried out with a reduced number of pixels, so that the process load is reduced, and therefore the process can be more quickly completed and the transition to the subsequent process will be performed more quickly than in the related-art.

Furthermore, since omnidirectional images are recorded on the recording medium without change, the development process and other processes on the omnidirectional images can be performed afterwards by an external apparatus such as a personal computer, etc.

While the exemplary embodiments in which an entire 360-degree area is covered as a camera view and an image thereof is captured and recorded have been described, the present invention is also applicable to a case where an area of a specific angle range in the circumferential direction, for example, a range of 180 degrees or 270 degrees in angle, is covered as a camera view. Furthermore, the present invention is also applicable to a case where images of regions divided in a circumferential direction are simultaneously captured. In other words, the present invention is applicable to the case where not only complete omnidirectional images or images of entire-circumference areas but also images of areas that each extends along not all but part of an entire circumference (referred to as surrounding images) are recorded.

While the present invention has been described in detail with reference to the preferred exemplary embodiments thereof, the present invention is not limited to these specific exemplary embodiments, but further includes various other forms without departing from the gist of the invention. Portions of the foregoing exemplary embodiments may be combined as appropriate.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-184694 filed Sep. 6, 2013, which is hereby incorporated by reference herein in its entirety.

What is claimed is:

1. An image recording apparatus comprising:
   memory, and at least one processor coupled to the memory, and the at least one processor having stored thereon instructions which, when executed by the at least one processor cause the image recording apparatus to function as:
   a determination unit configured to determine whether an input image is an ordinary rectangular image or a surrounding image depending on black distribution in the input image;
   a development unit configured to generate a developed image obtained by developing the surrounding image in a circumferential direction; and
   a control unit configured to record the input image on a recording medium that is detachable from the image recording apparatus,
   wherein when the input image is determined as being the surrounding image, the control unit performs control so that the developed image is generated by the development unit, and is recorded on the recording medium, and when the input image is determined as not being the surrounding image, the control unit performs control so that the input image is recorded on the recording medium without generating the developed image by the development unit, and wherein, in a case where the input image is an input image captured in a firework imaging mode or a nightscape imaging mode, determination by the determination unit is not performed, and the control unit performs control so that the input image is recorded on the recording medium without generating the developed image.

2. The image recording apparatus according to claim 1, further comprising a thumbnail generation unit configured to generate a thumbnail image from the input image, wherein when the input image is determined as not being the surrounding image, the control unit performs control so that the thumbnail image generated by the thumbnail generation unit is recorded on the recording medium.

3. The image recording apparatus according to claim 2, wherein the control unit performs control so that the thumbnail image generated by the thumbnail generation unit is recorded on the recording medium, together with the input image.

4. The image recording apparatus according to claim 3, wherein when the input image is determined as being the surrounding image, the control unit performs control so that the developed image generated by the development unit is recorded as the thumbnail image on the recording medium, together with the input image.

5. The image recording apparatus according to claim 1, wherein when the input image is determined as being the surrounding image, the control unit performs control so that the developed image obtained by reducing the input image in size and then developing the reduced input image in the circumferential direction by the development unit is recorded on the recording medium, together with the input image.

6. The image recording apparatus according to claim 1,
wherein when the input image is determined as being the surrounding image, the control unit performs control so that the input image and the developed image obtained by reducing the input image in size and then developing the reduced input image in the circumferential direction by the development unit are recorded on the recording medium, and wherein when the input image is determined as not being the surrounding image, the input image and a size-reduced image obtained by reducing the input image in size are recorded on the recording medium.

7. The image recording apparatus according to claim 1, wherein the determination unit determines whether the input image is the surrounding image based on whether a specific portion of the input image is black.

8. The image recording apparatus according to claim 7, wherein the specific portion includes a periphery and a central portion.

9. The image recording apparatus according to claim 1, wherein the determination unit determines whether the input image is the surrounding image, according to distributions of a specific color in the input image.

10. The image recording apparatus according to claim 1, wherein the control unit performs control so that information that indicates whether the input image is the surrounding image is recorded on the recording medium.

11. The image recording apparatus according to claim 1, wherein the surrounding image is an omnidirectional image.

12. The image recording apparatus according to claim 1, wherein the development unit generates a panoramic image obtained by developing the surrounding image in the circumferential direction.

13. The image recording apparatus according to claim 1, wherein when the input image is determined as being the surrounding image, the control unit performs control so that the developed image, instead of the input image, is recorded on the recording medium.

14. The image recording apparatus according to claim 1 is an imaging apparatus including an imaging unit, wherein the input image is an image captured by the imaging unit.

15. The image recording apparatus according to claim 14, wherein the imaging unit allows an omnidirectional imaging unit to be attached to and detached from the imaging unit;

and the image recording apparatus further comprising a detection unit configured to detect attachment of the omnidirectional imaging unit to the imaging unit; and the determination unit determines whether the input image is the surrounding image, according to a result of detection by the detection unit.

16. A control method for an image recording apparatus, comprising:

determining whether an input image is an ordinary rectangular image or a surrounding image depending on black distribution in the input image; and performing control so that a developed image is generated by developing the surrounding image in a circumferential direction, and recording the developed image on a attachable/detachable recording medium when the input image is determined as being the surrounding image, and performing control so that the developed image is not generated and the input image is recorded on the recording medium when the input image is determined as not being the surrounding image, wherein, in a case where the input image is an input image captured in a firework imaging mode or a nightscape imaging mode, determination of the input image as being the surrounding image is not performed, and performing control so that the input image is recorded on the recording medium without generating the developed image.

17. A non-transitory computer-readable storage medium storing a program for causing a computer to execute the control method for the image recording apparatus according to claim 16.

* * * * *